(12) United States Patent (10) Patent No.: US 8,756,438 B2
Devadas et al. (45) Date of Patent: *Jun. 17, 2014

(54) SECURELY FIELD CONFIGURABLE DEVICE

(75) Inventors: Srinivas Devadas, Lexington, MA (US); Thomas J. Ziola, Menlo Park, CA (US)

(73) Assignee: Verayo, Inc., San Jose, CA (US)

( * ) Notice: Subject to any disclaimer, the term of this patent is extended or adjusted under 35 U.S.C. 154(b) by 992 days.

This patent is subject to a terminal disclaimer.

(21) Appl. No.: 12/763,254

(22) Filed: Apr. 20, 2010

(65) Prior Publication Data

US 2010/0272255 A1 Oct. 28, 2010

Related U.S. Application Data

(63) Continuation of application No. 11/272,995, filed on Nov. 14, 2005, now Pat. No. 7,702,927.

(60) Provisional application No. 60/627,605, filed on Nov. 12, 2004, provisional application No. 60/629,953, filed on Nov. 22, 2004, provisional application No. 60/647,575, filed on Jan. 27, 2005.

(51) Int. Cl.
*H04L 29/06* (2006.01)
*H04L 9/32* (2006.01)
*H04L 9/08* (2006.01)

(52) U.S. Cl.
CPC ............ *H04L 9/3278* (2013.01); *H04L 9/0877* (2013.01)
USPC ................................ 713/193; 713/1; 380/44

(58) Field of Classification Search
CPC ..... H04L 9/3278; H04L 9/304; H04L 9/0838; H04L 9/0877; G06F 21/31; G06F 21/445; G06F 21/602; G06F 21/76

USPC .................................. 713/189, 191, 193, 153
See application file for complete search history.

(56) References Cited

U.S. PATENT DOCUMENTS

| | | | |
|---|---|---|---|
| 4,985,614 A | 1/1991 | Pease | |
| 5,177,352 A | 1/1993 | Carson et al. | |
| 5,180,901 A | 1/1993 | Hiramatsu | |
| 5,204,902 A | 4/1993 | Reeds, III et al. | |

(Continued)

FOREIGN PATENT DOCUMENTS

| CA | 2344429 | 3/2000 |
|---|---|---|
| DE | 198 43 424 | 3/2000 |

(Continued)

OTHER PUBLICATIONS

Ross Anderson et al. "Tamper Resistance—a Cautionary Note". Cambridge University, Cambridge, England. Nov. 1996.

(Continued)

*Primary Examiner* — David García Cervetti
(74) *Attorney, Agent, or Firm* — Occhiuti & Rohlicek LLP

(57) ABSTRACT

A field configurable device, such as an FPGA, supports secure field configuration without using non-volatile storage for cryptographic keys on the device and without requiring a continuous or ongoing power source to maintain a volatile storage on the device. The approach can be used to secure the configuration data such that it can in general be used on a single or a selected set of devices and/or encryption of the configuration data so that the encrypted configuration data can be exposed without compromising information encoded in the configuration data.

10 Claims, 9 Drawing Sheets

(56) References Cited

U.S. PATENT DOCUMENTS

| | | | |
|---|---|---|---|
| 5,265,164 A * | 11/1993 | Matyas et al. .................. | 380/30 |
| 5,375,169 A | 12/1994 | Seheidt et al. | |
| 5,388,157 A | 2/1995 | Austin | |
| 5,528,231 A | 6/1996 | Patarin | |
| 5,768,382 A | 6/1998 | Schneier et al. | |
| 5,818,738 A | 10/1998 | Effing | |
| 5,862,094 A | 1/1999 | Kawabata | |
| 5,883,956 A | 3/1999 | Le et al. | |
| 5,896,300 A | 4/1999 | Raghavan et al. | |
| 5,917,913 A * | 6/1999 | Wang ............................. | 705/67 |
| 5,920,628 A | 7/1999 | Indeck | |
| 5,970,142 A * | 10/1999 | Erickson ....................... | 713/189 |
| 6,026,293 A | 2/2000 | Osborn | |
| 6,038,315 A | 3/2000 | Strait et al. | |
| 6,047,068 A * | 4/2000 | Rhelimi et al. ................ | 380/46 |
| 6,118,869 A | 9/2000 | Kelem et al. | |
| 6,161,213 A | 12/2000 | Lofstrom | |
| 6,212,639 B1 * | 4/2001 | Erickson et al. ............... | 726/26 |
| 6,246,254 B1 | 6/2001 | Choukalos et al. | |
| 6,282,656 B1 * | 8/2001 | Wang ............................. | 726/4 |
| 6,289,292 B1 | 9/2001 | Charlton et al. | |
| 6,289,453 B1 | 9/2001 | Walker et al. | |
| 6,301,695 B1 | 10/2001 | Burnham et al. | |
| 6,305,005 B1 | 10/2001 | Burnham | |
| 6,324,676 B1 | 11/2001 | Burnham et al. | |
| 6,351,814 B1 | 2/2002 | Batinic et al. | |
| 6,356,637 B1 * | 3/2002 | Garnett ......................... | 380/265 |
| 6,363,485 B1 | 3/2002 | Adams | |
| 6,366,117 B1 * | 4/2002 | Pang et al. ..................... | 326/38 |
| 6,386,456 B1 | 5/2002 | Chen et al. | |
| 6,402,028 B1 | 6/2002 | Graham, Jr. et al. | |
| 6,529,793 B1 | 3/2003 | Beffa | |
| 6,535,016 B2 | 3/2003 | Choukalos et al. | |
| 6,553,558 B2 | 4/2003 | Palmer et al. | |
| 6,654,889 B1 | 11/2003 | Trimberger | |
| 6,738,788 B1 | 5/2004 | Horng et al. | |
| 6,802,447 B2 | 10/2004 | Horng | |
| 6,813,599 B1 | 11/2004 | Court et al. | |
| 6,834,346 B1 * | 12/2004 | Ishibashi et al. ............... | 713/179 |
| 6,848,049 B1 | 1/2005 | Tailliet | |
| 6,865,502 B2 | 3/2005 | Devins et al. | |
| 6,894,527 B1 * | 5/2005 | Donlin et al. .................. | 326/8 |
| 6,898,708 B2 | 5/2005 | Hori et al. | |
| 6,904,527 B1 | 6/2005 | Parlour et al. | |
| 6,931,543 B1 * | 8/2005 | Pang et al. ..................... | 713/193 |
| 6,941,180 B1 | 9/2005 | Fischer et al. | |
| 6,941,536 B2 | 9/2005 | Muranaka | |
| 6,966,022 B1 | 11/2005 | Stenfort et al. | |
| 6,981,153 B1 * | 12/2005 | Pang et al. ..................... | 713/194 |
| 7,005,733 B2 | 2/2006 | Kommerling et al. | |
| 7,058,177 B1 * | 6/2006 | Trimberger et al. ............ | 380/28 |
| 7,117,373 B1 * | 10/2006 | Trimberger et al. .......... | 713/193 |
| 7,131,001 B1 | 10/2006 | Johnson | |
| 7,143,436 B2 | 11/2006 | Yamaguchi et al. | |
| 7,191,339 B1 | 3/2007 | Trimberger | |
| 7,191,340 B2 | 3/2007 | Wuidart et al. | |
| 7,203,842 B2 * | 4/2007 | Kean ............................. | 713/189 |
| 7,210,634 B2 | 5/2007 | Sapiro | |
| 7,216,232 B1 | 5/2007 | Cox | |
| 7,219,237 B1 * | 5/2007 | Trimberger .................... | 713/193 |
| 7,243,236 B1 | 7/2007 | Sibert | |
| 7,249,108 B1 | 7/2007 | Walmsley et al. | |
| 7,249,408 B2 | 7/2007 | Walmsley et al. | |
| 7,251,730 B2 | 7/2007 | Rose et al. | |
| 7,269,724 B1 | 9/2007 | Trimberger et al. | |
| 7,373,668 B1 * | 5/2008 | Trimberger .................... | 726/26 |
| 7,564,345 B2 * | 7/2009 | Devadas et al. ............. | 340/539.1 |
| 7,577,850 B2 | 8/2009 | Barr | |
| 2001/0015919 A1 * | 8/2001 | Kean ............................. | 365/200 |
| 2001/0032318 A1 * | 10/2001 | Yip et al. ....................... | 713/190 |
| 2001/0033012 A1 | 10/2001 | Kommerling et al. | |
| 2001/0037458 A1 * | 11/2001 | Kean ............................. | 713/193 |
| 2002/0023215 A1 * | 2/2002 | Wang et al. .................... | 713/171 |
| 2002/0065574 A1 | 5/2002 | Nakada | |
| 2002/0080974 A1 * | 6/2002 | Grawrock ..................... | 380/282 |
| 2002/0095594 A1 | 7/2002 | Dellmo et al. | |
| 2002/0106087 A1 | 8/2002 | Lotspiech et al. | |
| 2002/0107798 A1 | 8/2002 | Hameau et al. | |
| 2002/0128983 A1 | 9/2002 | Wrona et al. | |
| 2002/0150252 A1 | 10/2002 | Wong | |
| 2002/0188857 A1 | 12/2002 | Orlando et al. | |
| 2002/0199110 A1 | 12/2002 | Kean | |
| 2003/0041254 A1 * | 2/2003 | Challener et al. ............. | 713/193 |
| 2003/0140241 A1 | 7/2003 | England et al. | |
| 2003/0204731 A1 | 10/2003 | Pochuev et al. | |
| 2003/0204743 A1 | 10/2003 | Devadas | |
| 2003/0219121 A1 | 11/2003 | Van Someren | |
| 2004/0136529 A1 | 7/2004 | Rhelimi et al. | |
| 2004/0148509 A1 | 7/2004 | Wu | |
| 2005/0051351 A1 | 3/2005 | De Jongh et al. | |
| 2006/0210082 A1 * | 9/2006 | Devadas et al. ............... | 380/277 |
| 2007/0038871 A1 | 2/2007 | Kahlman et al. | |
| 2007/0039046 A1 | 2/2007 | Van Dijk et al. | |
| 2007/0044139 A1 | 2/2007 | Tuyls et al. | |
| 2008/0044027 A1 | 2/2008 | Van Dijk | |
| 2008/0059809 A1 | 3/2008 | Van Dijk | |
| 2008/0106605 A1 | 5/2008 | Schrijen et al. | |
| 2009/0083833 A1 * | 3/2009 | Ziola et al. ......................... | 726/2 |
| 2011/0148457 A1 * | 6/2011 | Abramovici ..................... | 326/8 |
| 2011/0215829 A1 * | 9/2011 | Guajardo Merchan et al. .. | 326/8 |

FOREIGN PATENT DOCUMENTS

| | | |
|---|---|---|
| EP | 1100058 | 5/2001 |
| EP | 1341214 | 9/2003 |
| WO | WO 00/17826 | 3/2000 |
| WO | WO01/50530 | 7/2001 |
| WO | WO02/13452 | 2/2002 |
| WO | WO 02/45139 | 6/2002 |
| WO | WO03/107201 | 12/2003 |
| WO | WO2003/107201 | 12/2003 |
| WO | WO2004/102302 | 11/2004 |
| WO | WO20004/102302 | 11/2004 |
| WO | WO2004/104899 | 12/2004 |
| WO | WO2004/105125 | 12/2004 |
| WO | WO20004/105125 | 12/2004 |
| WO | WO2005/043805 | 5/2005 |
| WO | WO2005/048179 | 5/2005 |
| WO | WO2005/048256 | 5/2005 |
| WO | WO2005/059629 | 6/2005 |
| WO | WO2005/086158 | 9/2005 |
| WO | WO2006/038183 | 4/2006 |
| WO | WO2006/040724 | 4/2006 |
| WO | WO2004/114122 | 6/2006 |

OTHER PUBLICATIONS

Ross Anderson et al. "Low Cost Attacks on Tamper Resistant Devices". Cambridge University, Cambridge, England. Apr. 1997.
Duane S. Boning et al. "Models of Process Variations in Device and Interconnect," Massachusetts Institute of Technology, Cambridge, MA Aug. 23, 1999.
Srinivas Devadas et al., "Synthesis of Robust Delay-Fault Testable Circuits: Theory" Massachusetts Institute of Technology, Cambridge, MA Jan. 1992.
Srinivas Devadas et al., "Synthesis of Robust Delay-Fault Testable Circuits: Practice" Massachusetts Institute of Technology, Cambridge, MA Mar. 1992.
Pappu Srinivasa Ravikanth. "Physical One-Way Funcitons". Massachusetts Institute of Technology, Cambridge, MA. Mar. 2001.
Sean W. Smith et al. "Building a High-Performance, Programmable Secure Coprocessor". IBM T.J. Watson Research Center, Yorktown Heights, NY. Oct. 16, 1998.
Hon-Sum Wong et al."Three-Dimensional Atomistic" Simulation of Descrete Random Dopant Distribution Effects in Sub-0.1μm MOSFET's JEDM, 29(2):705-708, 1993.
Bennet Yee, "Using Secure Coprocessors," Carnegie Mellom University, Pittsburg, PA. May 1994.
Daihyun Lim "Extracting Secret Keys from Integrated Circuits" Massachusetts Institute of Technology, Cambridge, MA, May 2004.
Xilinx (Ralf Krueger) "Using High Security Features in Virtex-II Series FPGAs" www.xilinx.com; [printed Jul. 8, 2004].

(56) References Cited

OTHER PUBLICATIONS

Lee et al., "A technique to Build a Secret Key in Integrated Circuits for Identification and Authentication Applications," Massachusetts Institute of Technology (CSAIL) Jun. 2004.

Skoric et al., "Robust Key Extraction from Physical Uncloneable Functions," Proc. Applied Cryptography and Network Security 2005, LNCS 3531, pp. 407-422.

Tuyls et al., "Security Analysis of Physical Uncloneable Functions," Proc. Conf. on Financial Cryptography and Date Security , Mar. 2005. LNCS 3570, pp. 141-155.

Tuyls et al., "Information—Theoretic Security Analysis of Physical Uncloneable Functions," Proceedings ISIT 2004 (Chicago), p. 141.

Blaise Gassend et al., "Silicon Physical Unknown Funcitons and Secure Smartcards," Massachusetts Institute of Technology, Cambridge, MA May 13, 2002.

Blaise Gassend, "Physcial Random Functions," Massachusetts Institute of Technology, Cambridge, MA Feb. 2003.

Blaise Gassend et al, "Controlled Physical Unknown Functions: Applications to Secure Smartcards and Certified Execution," Massachusetts Institute of Technology, Cambridge, Jun. 10, 2002.

G. Edwards Suh, et al., "Design and Implementation of the AEGIS Single-Chip Secure Processor Using Physical Random Functions, " *In the proceedings of the 32nd International Symposium on Computer Architecture, Madison, Wisconson*, Architecture, 2005, Jun. (Memo-483).

Milor et al., "Logic Product Speed Evaluation and Forecasting During the Early Phases of Process Technology Development Using Ring Oscillator Data". AMD, Sunnyvale, CA (Abstract).

Ranasinghe et al. "Securityand Privacy Solutions for Low-Cost RFID Systems" IEEE, pp. 337-342 (2004).

Arazi, B. "Interleaving Security and Efficiency Consiederations in the Design of Inexpensive IC Cards". IEEE Proceedings on Computers and Digital Techniques. vol. 141, Issue 5. Publ Date: Sep. 1994. pp. 265-270.

Omura, J.K., "Novel Applications of Cryptogrtaphy in Digital Communications," IEEE Comm. Mag., May 1990, pp. 21-29.

Srimvas Devadas et al., "Synthesis of Robust Delay-Fault Testable Circuits: Theory" Massachusetts Institute of Technology, Cambridge, MA Jan. 1992.

Blaise Gassend et al., "Silicon Physical Random Functions", MIT, Proceedings of the Computer and Communication Security Conference, Nov. 2002, Memo 456.

Gassend, B.L.P., Physical Random Functions; Thesis, Thesis at the Massachusetts Institute of Technology, pp. 1-89 (Feb. 1, 2003) XP002316843.

Tuyls, Pim and Lejla Batina, "RFID-Tags for Anti-Counterfeiting," Topics in Cryptography, vol. 3860/2006, No. LNCS3860, (Feb. 13, 2005) XP002532233.

Ross Miderson et al. "Tamper Resistance—a Cautionary Note". Cambridge University, Cambridge, England. Nov. 1996.

Duane S. Boning et al., "Models of Process Variations in Device and Interconnect," Massachusetts Insitute of Technology, Cambridge, MA Aug. 23, 1999.

Pappu Srinivasa Ravikanth. "Physical One-Way Functions". Massachusetts Institute of Technology, Cambridge, MA. Mar. 2001.

Hon-Sum Wong et al. "Three-Dimensional "Atomistic" Simulation of Discrete Random Dopant Distribution Effects in Sub-0.1µ MOSFET's".IEDM, 29(2):705-708, 1993.

Bennet Yee, "Using Secure Coprocessors," Carnegie Mellon University, Pittsburg, PA. May 1994.

Daihyun Lim, "Extracting Secret Keys from Integrated Circuits" Massachusetts Institute of Technology, Cambridge, MA, May 2004.

Tuyls et al., "Security Analysis of Physical Uncloneable Functions," Proc. 9th Conf. on Financial Cryptography and Data Security , Mar. 2005, LNCS 3570, pp. 141-155.

Tuyls et al., "Information-Theoretic Security Analysis of Physical Uncloneable Functions," Proceedings ISIT 2004 (Chicago), p. 141.

Blaise Gassend et al., "Silicon Physical Unknown Functions and Secure Smartcards," , Massachusetts Institute of Technology, Cambridge, MA May 13, 2002.

Blaise Gassend, "Physical Random Functions," Massachusetts Institute of Technology, Cambridge, MA Feb. 2003.

Blaise Gassend et al. "Controlled Physical Unknown Functions: Applications to Secure Smartcards and Certified Execution," Massachusetts Institute of Technology, Cambridge, Jun. 10, 2002.

G. Edward Suh, et al., "Design and Implementation of the AEGIS Single-Chip Secure Processor Using Physical Random Functions," *In the proceedings of the 32nd International Symposium on Computer Architecture, Madison, Wisconsin*, Architecture, 2005, Jun. (Memo-483).

Milor et al., "Logic Product Speed Evaluation and Forecasting During the Early Phases of Process Technology Development Using Ring Oscillator Data", AMD, Sunnyvale, CA. (Abstract).

\* cited by examiner

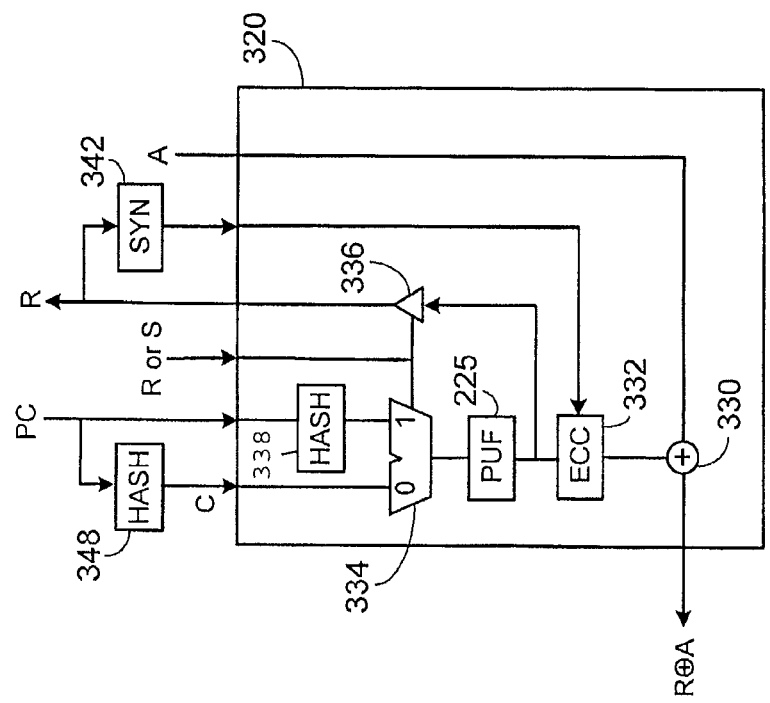
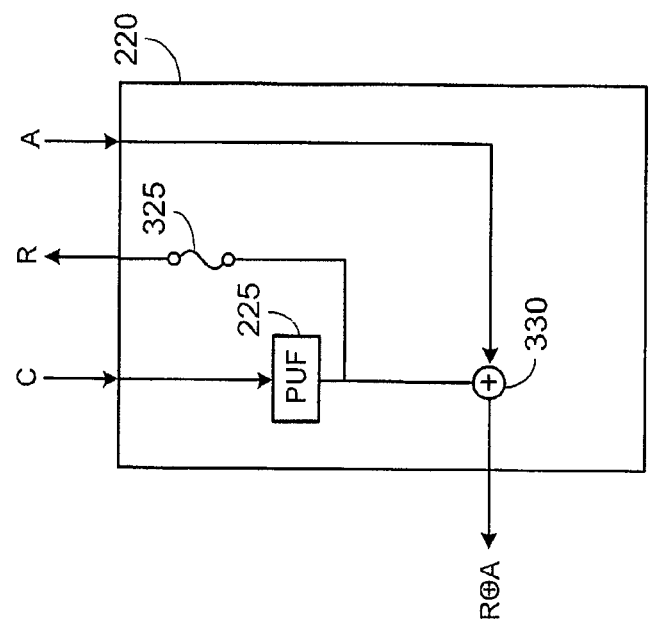
FIG. 3B
FIG. 3A

SECURELY FIELD CONFIGURABLE DEVICE

CROSS-REFERENCE TO RELATED APPLICATIONS

This application is a continuation of U.S. application Ser. No. 11/272,995, which issued as U.S. Pat. No. 7,702,927 on Apr. 20, 2010, which claims the benefit of the following U.S. Provisional Application Ser. No. 60/627,605, filed Nov. 12, 2004; No. 60/629,953, filed Nov. 22, 2004; and No. 60/647,575, filed Jan. 27, 2005. Each of these applications is incorporated herein by reference.

This application is also related to U.S. application Ser. No. 11/273,920, which issued as U.S. Pat. No. 7,564,345 on Jul. 21, 2009, which is also incorporated herein by reference.

This application is also related to U.S. application Ser. No. 10/407,603, titled "Authentication of Integrated Circuits," filed on Apr. 4, 2003, and published on Oct. 30, 2003, as US2003/0204743A1, which is also incorporated herein by reference.

BACKGROUND

This invention relates to secure configuration of a field configurable logic device.

Field configurable devices, such as field programmable gate arrays (FPGAs), are typically configured using data that is supplied to the device after the device is deployed in an application. For example, the configuration data is provided to the device when the device is powered on.

It may be desirable to avoid disclosure of the configuration data. For example, the configuration data may include secrets, such as cryptographic keys or procedures, that are necessary to keep private. It may be also desirable to prevent configuration of the device with unauthorized configuration data.

Referring to FIG. 1, one approach that has been used to provide security for an FPGA 110 is to implement a decryptor function 140 (e.g., a 3DES decryptor) and a volatile memory function 120 (e.g., static RAM) on the same devices as the configurable logic 150. The volatile memory holds a cryptographic key 125 that is provided to the decryptor function. Configuration data 160 for the device is provided to the device in an encrypted form 180 and a configuration module 145 uses the decryptor 140 to decrypt the configuration data as it is loaded into the device before it is used to configure the configurable logic. The cryptographic keys are set and stored on the device before it is deployed, and a dedicated battery 130 is used to maintain the volatile memory—if the battery is removed then the keys are erased. The provider of the configuration data knows the keys stored in the device and therefore can encrypt (170) the configuration data suitably for a particular device. An example of this approach is type of approach is commercially available in the Xilinx Virtex II™ family of FPGAs.

Authentication of integrated circuits has been suggested using device characteristics that vary from device to device based on variation in the fabrication process. Some such approaches are described in US Application Publication US2003/0204743A1, titled "Authentication of Integrated Circuits," which is incorporated herein by reference.

SUMMARY

In a general aspect, a field configurable device, such as an FPGA, supports secure field configuration without using non-volatile storage for cryptographic keys on the device and without requiring a continuous or ongoing power source to maintain a volatile storage on the device. The approach can be used to secure the configuration data such that it can in general be used on a single or a selected set of devices and/or encryption of the configuration data so that the encrypted configuration data can be exposed without compromising information encoded in the configuration data.

One approach to generating decryption keys needed for loading of encrypted configuration data makes use of variations in the fabrication process for the FPGAs. The variations from device to device are used to internally generate the decryption key so that encrypted configuration data is not exposed in unencrypted form outside the FPGA. Because the decryption key is generated rather than stored inside or external to the FPGA, the key is difficult if not impossible to obtain from the FPGA itself.

In another aspect, in general, an electronic device includes a configuration module that provides an interface to the device for data for configuring logic on the device. The configuration data includes encrypted configuration data. The device also includes a first module that includes circuitry for generating a volatile response that varies among devices fabricated according to a same design as the device. A cryptographic module is coupled to the first module and to the configuration module. The cryptographic module is configured to decrypt the encrypted configuration data according to the response generated by the first module.

Aspect can include one or more of the following features.

The device includes a programmable gate array, and the configuration module is adapted to configure the programmable gate array according to the decrypted configuration data.

The first module is implemented using dedicated logic on the device and/or is implemented using configurable logic on the device.

The first module is configured to provide a key value to the cryptographic module determined using the volatile response.

The first module is configured to (a) accept a first input value and generate the volatile response based on the first input value, and/or (b) accept a second input value and combine the volatile response and the second input value to determine the key value.

The device includes a non-volatile storage for at least one of the first input value and the second input value.

At least one of the first input value and the second input value is provided to the device.

The first module is configured to accept the first input value and to generate the volatile response based on the first input value.

The first module is configured to accept the second input value and to combine the volatile response and the second input value to determine the key value.

The first module is configured accept a first input value and to generate the volatile response based on the first input value.

The device includes circuitry to prevent disclosure of the volatile response based on an input of the first value to the device.

In another aspect, in general, a method for configuring an electronic device includes providing configuration data to the device. The configuration data includes encrypted configuration data. A volatile key is generated using circuitry in the device. The key is used to decrypt the encrypted configuration data within the device. Logic on the device is then configured using the decrypted configuration data.

Aspects can include one or more of the following features.

Configuring the device includes configuring a programmable gate array according to the decrypted configuration data.

All information stored on the device from which the volatile key can be determined is cleared prior to generating the volatile key.

Generating the volatile key is performed without the device receiving information from which the volatile key can be determined subsequent to the clearing of the information.

Providing the configuration data to the device includes providing data for configuring logic on the device to form at least part of the circuitry used to generate the volatile key.

Providing the configuration data to the device includes providing data for configuring logic on the device to implement at least part of the decryption of the encrypted configuration data.

Generating the volatile key includes generating a volatile response.

A first input value is provided to the device that is used to generate the volatile response based.

A second input value is provided to the device. The volatile response and the second input value are combined to determine the volatile key.

At least one of the first value and the second value are stored in a non-volatile storage on the device.

At least one of the first value and the second value are determined such that a desired volatile key is generated.

In another aspect, in general, a method for configuring an electronic device includes forming first configuration data for the device. The first configuration data includes data for forming a first module for generating a volatile response that varies among like devices configured according to the configuration data. The device is configured using the first configuration data. A first volatile response is generated from the first module using the configured device. A signal is output from the device that depends on the volatile response.

Aspects can include one or more of the following features.

Second configuration data for the device is formed based on the outputted signal. The second configuration data includes data for forming the first module and data for implementing a comparison of the first volatile response and a volatile response generated by the first module according to the second configuration data.

The device is configured using the second configuration data.

The device is operated as configured using the second configuration data. This operation includes comparing the first volatile response and a volatile response generated by the first module and selectively inhibiting operation of functionality specified in the second configuration data depending on the comparison.

The second configuration data includes data for inhibiting operation of functionality specified in the second configuration data depending on the comparison.

The second configuration data includes data representing a value determined from the outputted signal.

In another aspect, in general, a method for authorizing use of configuration data features determining a volatile response generated by each of a set of configurable electronic devices. The volatile responses are each stored in association with an identifier for each of the devices. An identifier of one of the devices is later accepted from a user of the device. Authorization data based on the stored volatile response associated with the accepted identifier is then provided to the user.

Aspects can include one or more of the following.

The authorization data permits use of protected configuration data on the device.

A system that incorporates the device is configured according to the authorization data.

Accounting data is stored based on providing of authorization data to users.

The identifier from the user is passed over a public data network, and the authorization data is passed to the user of the public data network.

Aspects can have one or more of the following advantages.

Implementation of a volatile key generator in the field configurable device avoids the need for a battery to maintain cryptographic keys in the device. Use of a volatile key makes it difficult or impossible to access the key, thereby maintaining the security of data that requires the key for decryption.

Other features and advantages of the invention are apparent from the following description, and from the claims.

DESCRIPTION OF DRAWINGS

FIGS. 3A and 3B are diagrams illustrating PUF modules.

DESCRIPTION

Figure 1:
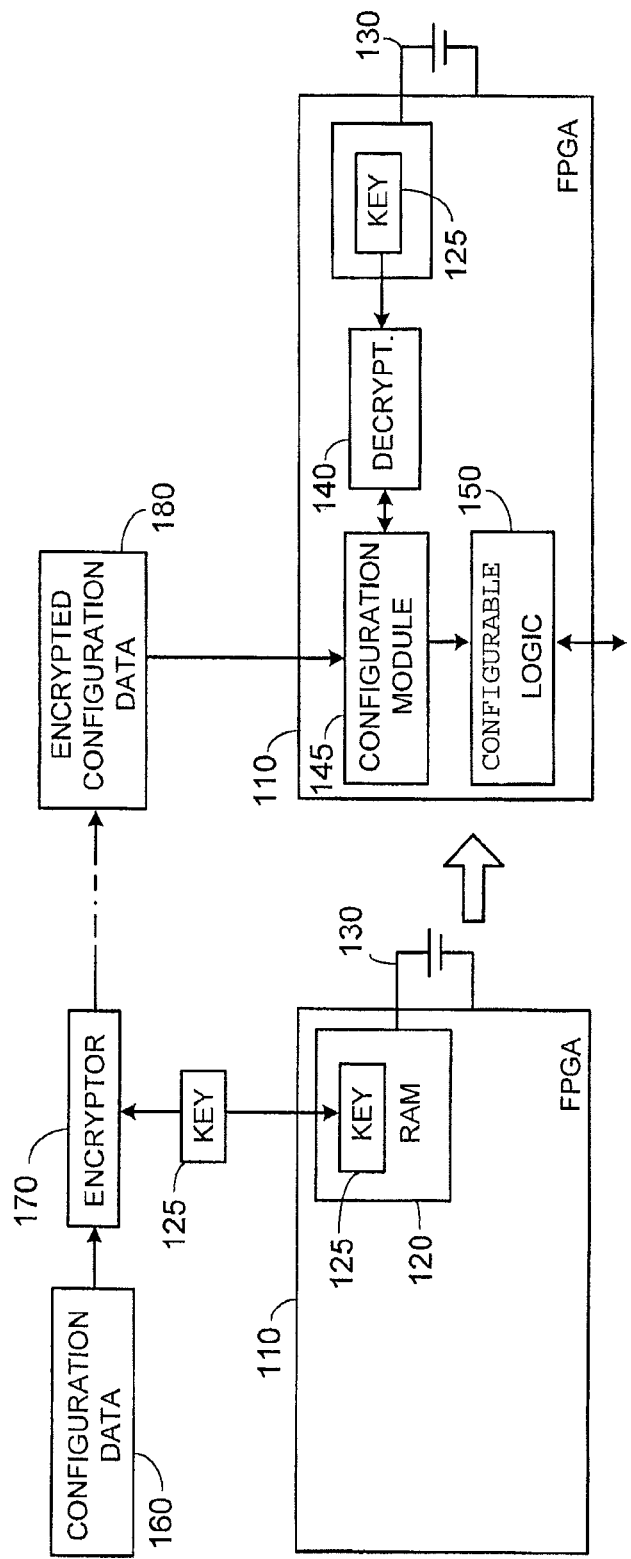
FIG. 1 is a diagram illustrating use of a battery-powered key storage on an FPGA.
Figure 2:
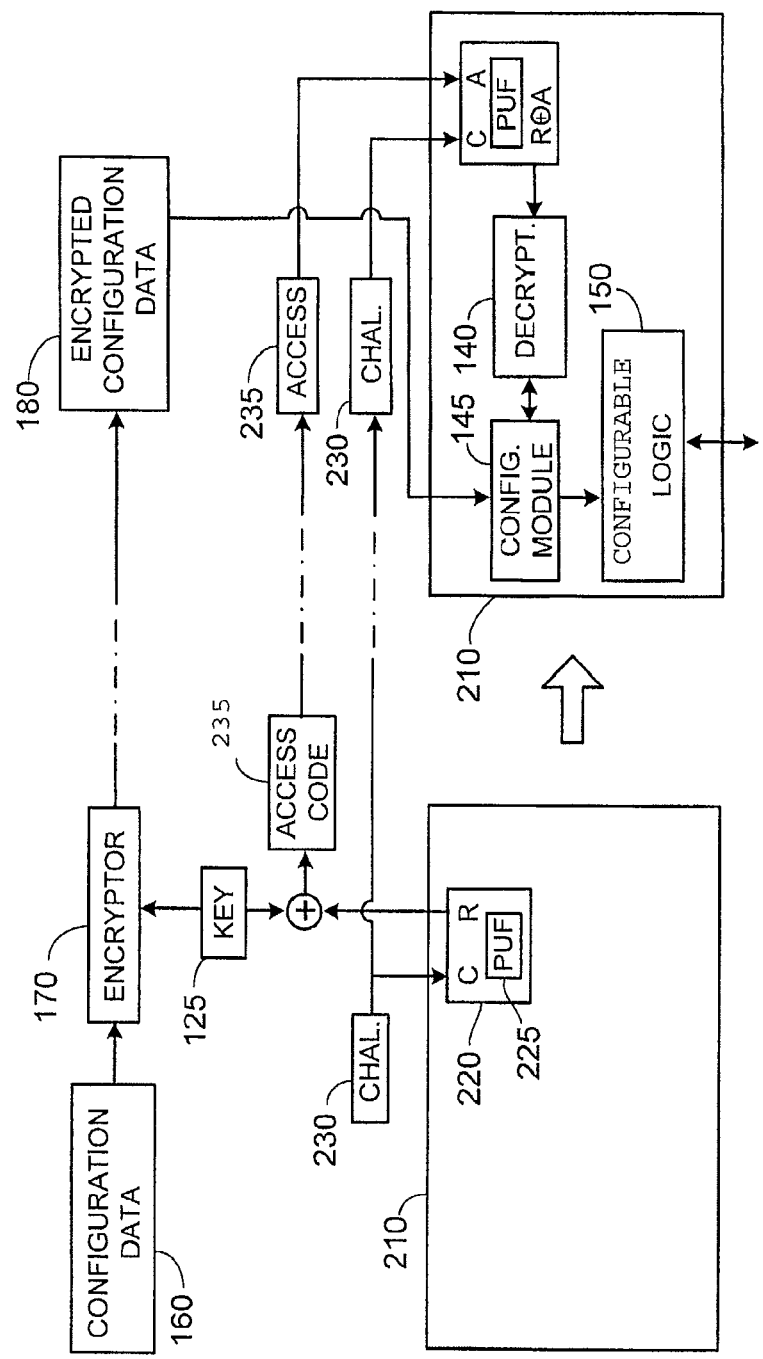
FIG. 2 is a diagram illustrating use of a physically unclonable function (PUF) circuit on an FPGA.

Referring to FIG. 2, a field programmable gate array (FPGA) 210, which is an example of a configurable electronic device that can be protected using the techniques described below, makes use of a physically unclonable function (PUF) circuit 225. As is described more fully below, the PUF circuit provides a digital value that is dependent on specific characteristics the particular FPGA but that is essentially unpredictable and not discoverable through examination of the device. For a set of devices that include a PUF circuit that is fabricated according to a same design (e.g., with the same circuit mask), the value produced by the circuit varies among those devices in essentially and unpredictable manner.

A PUF module 220, which incorporates the PUF circuit 225, accepts a digital challenge input (C) and based on the challenge input and physical characteristics of the PUF circuit produces the digital response (R). In general the challenge and response are multi-bit quantities (for example, 160 bits long).

Prior to deploying the FPGA, in an enrollment procedure, a party wishing to securely distribute configuration data for one or more FPGAs chooses a challenge input (C) and records the associated response (R) for each FPGA that will be deployed and to which configuration data will be sent. Optionally, the party records multiple challenge-response pairs for each FPGA device to be deployed.

Configuration data 160 for distribution and field programming into the FPGA is encrypted using an encryptor 170 according to a key 125, which is generally chosen by the party distributing the configuration data and kept secret. By encrypting the configuration data, unauthorized parties gaining access to the encrypted configuration data 180 cannot without great difficulty (i.e., by breaking the encryption) access the information encoded by the configuration data.

To load the configuration data, a particular FPGA internally reconstructs the key needed to decrypt the configuration data without disclosing the key outside the FPGA device and without storing the key in a non-volatile storage, which might be comprised. In order to enable the FPGA to reconstruct the key, the party enrolling the FPGA combines the key and the response from the PUF circuit, which depends on the challenge input in an unpredictable way, to produce an access code. The access code is provided to the FPGA in the field. The PUF response to the same challenge can then be combined in the field with the access code to determine the needed key. In this example, the key and the response are combined according to a bitwise exclusive OR operation. The PUF module 220 is configured such that when deployed in the field, the response (R) for a particular challenge cannot be determined from the device. Various approaches to preventing such access to the response for a particular challenge are described below. The access code can be made publicly available without compromising the PUF response and therefore without compromising the encryption key.

In the field, the encrypted configuration data 180, the challenge value 230 used during enrollment of the FPGA, and the computed access code 235 are made available to the party wishing to configure the device. Note that the access code is specific to the device while the challenge and the encrypted configuration data may be general to a number of device. Therefore, for example, the challenge may be distributed along with the encrypted configuration data and the access code may be distributed with the device.

The PUF module 220 is configured to accept the challenge value 230 and the access code 235, and compute a combination of the internally generated PUF response (R) and the accepted access code (A) that allows internal reconstruction of the key used to encrypt the configuration data. This computed key is not made available outside the device and therefore does not compromise the security of the configuration data. Internal to the FPGA 210, the computed key is provide to a decryptor 140. The configuration module 145 makes use of the decryptor 140 to decrypt the encrypted configuration data 180 before it is loaded into the configurable logic 150. The configurable logic implements logical functions using circuit elements specified by the configuration data. In this version of the approach, the decryptor 140 and the PUF module 220 make use of dedicated circuitry on the FPGA that is not necessarily configurable. The key provided to the decryptor is a volatile key in that the key value is lost when the FPGA is not powered, When the FPGA is once again powered, the key can be regenerated from the access code and challenge as needed.

In one example of this approach, the access code 235 is stored in a static memory (e.g., a ROM memory) external to the FPGA. The encrypted configuration data is provided on a memory, such as a dynamic RAM along with the challenge.

Referring to FIG. 3A, one version of the PUF module 220, includes a data path that provides the challenge value to the PUF circuit 225. The response (R) is provided to an output interface on the FPGA through a fusible link 325 so that it is accessible during enrollment of the FPGA. After enrollment and before deployment in the field, the fusible link 325 is opened ("blown") so that the response to any particular challenge can no longer be obtained from the PUF module. Internal to the PUF module, a bitwise exclusive OR element 330 accepts the output of the PUF circuit and the access code to compute the exclusive or of those value that are used as a key during loading of the encrypted configuration data.

Referring to FIG. 3B, another design of the PUF module 320 uses another approach to prevent output of the PUF response for any chosen challenge value, but that allows later repeated enrollment of the same device. The PUF module 320 makes use of a prechallenge value (PC) during enrollment. Internal to the PUF module 320, the challenge value (C) is computed for the challenge by a known but not easily invertible hash function 338, such as the Secure Hash Algorithm SHA-1. Because the hash function is known to the party enrolling the FPGA, the challenge value is also determined externally to the FPGA by that party. During enrollment, the internally computed challenge value passes to the PUF circuit 225 through a selector 334. The selector is controlled by a control signal RorS, which is set to 1 during enrollment and to 0 in the field. Only when RtoS is 1, the PUF response is passed through a buffer 336 to the output; when RtoS is 0, the PUF response is not provided to an output port of the FPGA. The prechallenge value is kept secret (or discarded) and the computed challenge value (C) is provided with the encrypted configuration data as described above. The access code is computed from the response and the desired key also as described above. In the field, in order to provide the challenge value to the PUF circuit, the RorS value must be set to 0, and therefore the PUF response is not accessible outside the PUF module. The hash function 338 may be kept secret. Even if know, the function is not easily inverted and therefore the prechallenge needed to generate the challenge value cannot easily be determined. Therefore the response value for the particular challenge cannot easily be determined by a party in the field, and therefore the decryption key remains secure.

An optional feature of the PUF module 320 is the use of an error correction code (ECC) module 332. In versions of the PUF circuit 225 which do not necessarily provide exactly the same response whenever a particular challenge is provided (for example, due to relatively small variations causes by environmental conditions such as temperature), the ECC module is used to "correct" any differences between the PUF response obtained in the field and the response used during enrollment. During enrollment, the response is used to determine redundant information, such as a BCH syndrome of the response. This syndrome is recorded along with the access code and provided to the FPGA in the field. The syndrome value is passed to the PUF module 320 and to the ECC module 332 so that even if the PUF response differs from the enrollment response in a limited number of bit positions, the enrollment response is provided at the output of the ECC module 332. Although the syndrome may provide some information about the possible values the enrollment response may have had, this information is not sufficient to reconstruct the response and thereby compromise the key.

Another approach to implementing error correction uses a voting approach. This alternative can be preferable because of the relative simplicity of implementing the error correction on an FPGA. In this approach, rather that using a single challenge-access code pair to generate a particular key, multiple challenge-access code pairs are used for the same key. Based on the design of the PUF circuit, for each different challenge input, the difference between the enrollment response and the in-the-field response is relatively independent. That is, for a the multi-bit response, the errors can be viewed as being distributed independently over the various bits of the response. Therefore, the key generated with different challenge-access code pairs is expected to have errors in somewhat independent bit positions. Each bit position of the key is considered independently and a final key determined by a majority vote of that bit position for the various input pairs. Note that if for any input pair there is a probability of error of p, then with N pairs and a key of length M the probability that the majority vote key is correct is approximately $(1-Mp^{N/2})$, which can be make small by increasing the number of pairs, N.

Figure 4:
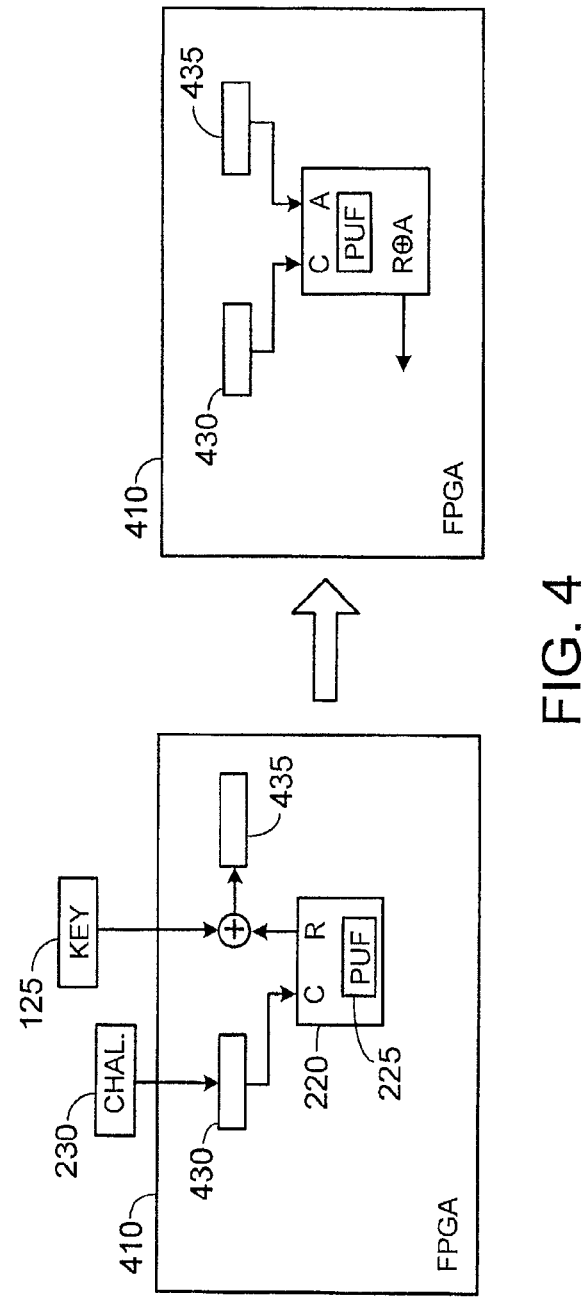
FIG. 4 is a diagram illustrating use of static storage in a PUF module.

Referring to FIG. 4, in another version of the approach, the challenge value 230 and the access code 125 are recorded in a non-volatile storage, 430 and 435 respectively, on a FPGA 410 itself. An array of (challenge, access code) pairs can be stored in the FPGA, each for internal generation of a different key. Examples of such a non-volatile storage are register of fusible links and EPROM registers. Although the values of the challenge and access code may be compromised by examination of the FPGA, as in the previous examples these values are not sufficient to determine the PUF response to the challenge and thereby the key value remains secure.

Figure 5:
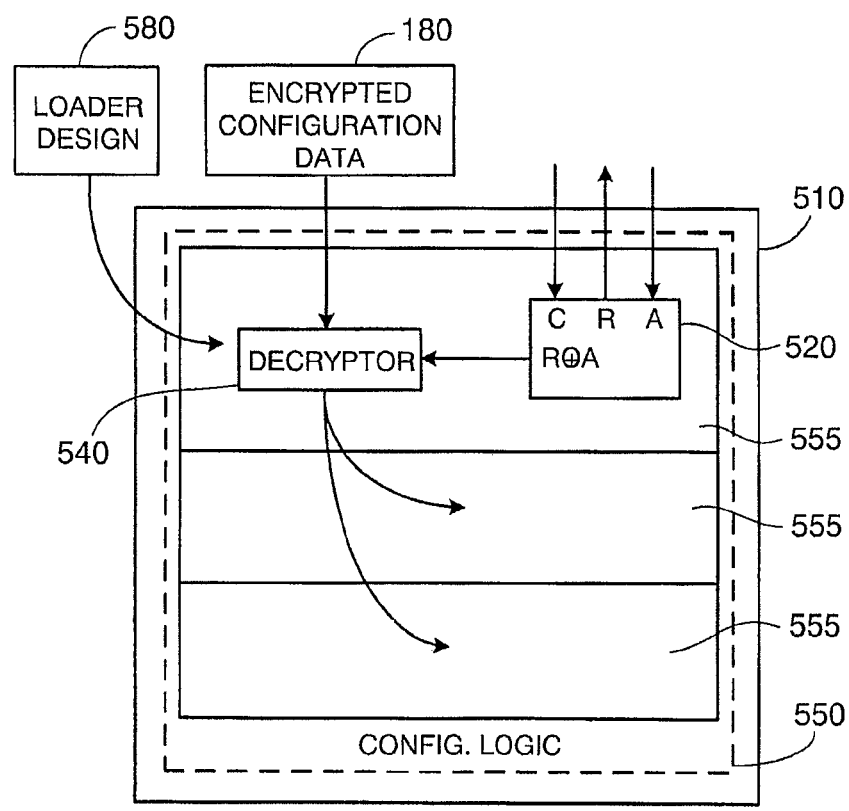
FIG. 5 is a diagram of a configurable device with independently configurable frames.

Referring to FIG. 5, in another example, an FPGA 510 includes configurable logic 550 that includes a number of separately configurable frames 555. Initially, a loader design 580 is loaded into a first frame 555 of the FPGA. This loader design configures the functionality of the decryptor 540 and PUF module 520 into the frame bank Once configured, these modules provide the functionality of the PUF module 320 and decryptor 140 that use dedicated circuitry in other examples. Specifically, the functionality implemented in the first frame is used to load and decrypt the encrypted configuration data 180, which is loaded into the remaining frames of the FPGA. An example of a commercially available devices that may support this feature include the Xilinx Virtex II™ family of devices that support the internal reconfiguration access port (ICAP) interface.

A number of other alternative approaches to maintaining the secrecy of the response to a particular challenge may be used in an approach such as that described above. For example, although described in terms of a symmetric key approach in which the same key is used for encryption and decryption, a public-private key pair can be generated and the access code computed by the party enrolling the FPGA so that the PUF module can internally generate the private key. One use of such a public key approach is that the public key for an FPGA can be made publicly available so that any party can securely provide information to the FPGA. One such use may be to encrypt the configuration data decryption key using the public key for the FPGA, thereby allowing only that FPGA to determine the decryption key and load the configuration data. Many other uses of the such a public-private key pair are possible using well known secure communication approaches.

Figure 6:
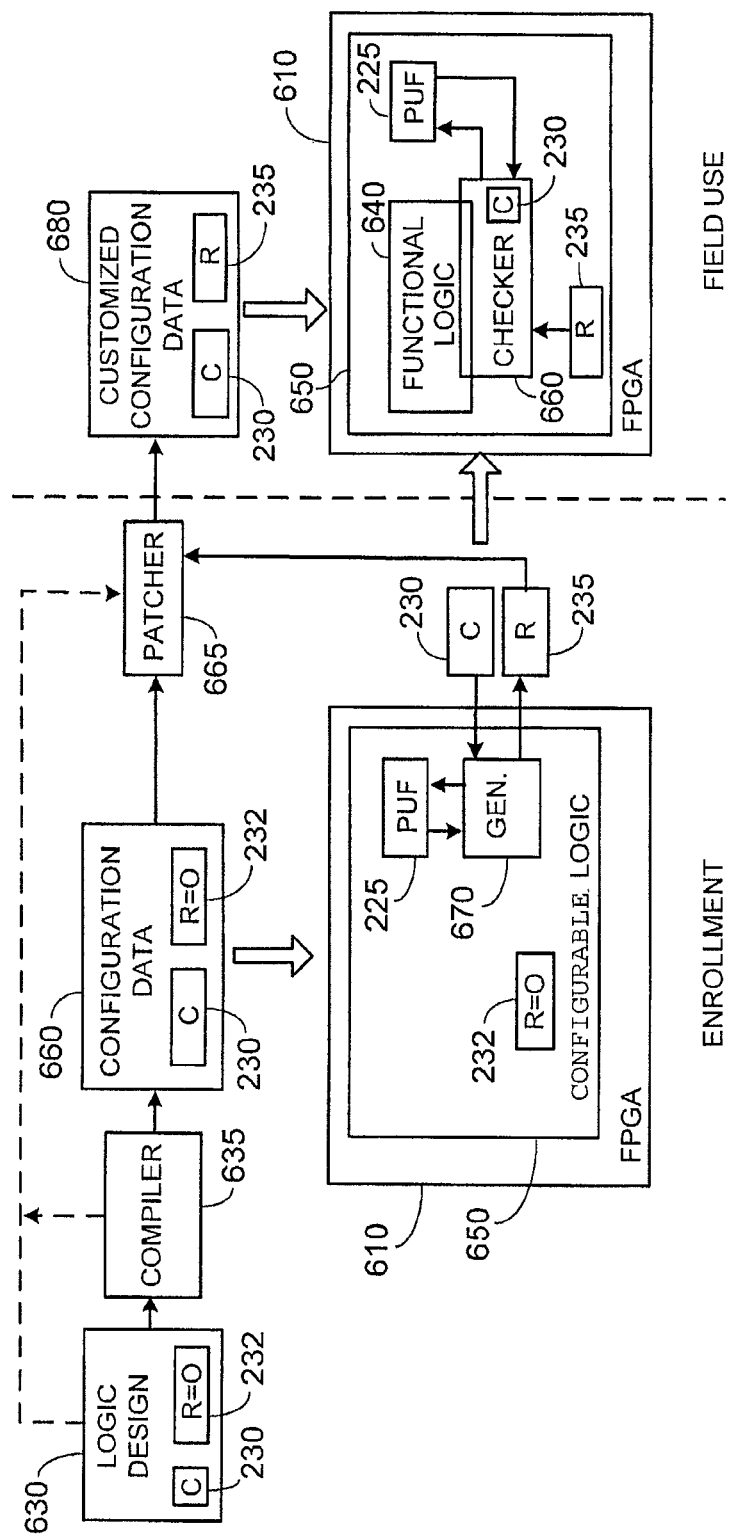
FIG. 6 is a diagram illustrating use of checking modules in a configurable device.

Referring to FIG. 6, in FPGAs 610 that do not include special purpose PUF modules or decryptors, and do not allow loading of such modules in separate frames of the configurable logic to be used to load the main portion of the logic configuration, PUF circuits can still be used to check that the configuration data is loaded and in use on an authorized FPGA. In general, in such an approach a PUF circuit 225 is implemented using a portion of the configurable logic 650 of the FPGA 610. A generator module 670, which is logically coupled to the PUF circuit and to input and output interfaces of the FPGA, is also loaded into the configurable logic. During an enrollment phase, a challenge 230 is passed to the PUF generator module via the generator module 670, and a corresponding response 235 is passed back from the PUF circuit through the generator module. Prior to deploying the configuration data for the FPGA, the response is incorporated into the configuration data. In the field, functions implemented in the configurable logic provide the same challenge as used in enrollment to the PUF circuit and check that the response is the same or suitably similar to the response provided through the generator module during enrollment. If the response in the field does not match, then functionality of the configured FPGA is disabled. Such a lack of a match typically occurs when the configuration data is loaded on a different FPGA than the one for which it was authorized and customized.

Continuing to refer to FIG. 6, a logic design 630 includes a design for functional logic as well as a number of additional components that are associated with the checking function. The logic design is specified, for example, using a Verilog specification, which identifies the logical components of the design but not necessarily the detailed layout of the design onto the configurable logic of the FPGA. The logic design 630 implements a PUF circuit 225, generator 670, and checker logic 660, which is described more fully below. The logic design 630 also embeds a challenge value 230, which will be used as input to the PUF circuit. The PUF response to the challenge is not yet known at this point, and a null (e.g., all zeros) response value 232 is also embedded in the logic design, for example, at a particular address in an addressable storage area specified in the logic design 630. This logic design is passed through a compiler 635 to produce the configuration data 660, which includes the challenge 230 and null response 232. In the course of the compilation process, the portions of the configure logic that hold the bit values of the challenge and the null response are distributed to logic elements such that, in general, examination of only the configuration data 660 does not easily yield the challenge value 230 or the circuit locations used to store the bits of the null response value 232.

During a enrollment of the FPGA 610, the configuration data 660 is used to configure the configurable logic 650 of the FPGA. The challenge value 230 is applied to the FPGA. Internally the portion of the circuitry implementing the generator module 670 accepts the challenge value and passes it to the circuitry implementing the PUF circuit and passes back the response 235.

The response 235 is used by a patcher 650 to replace the null values of the response in the configuration data 660 with the particular response 235 for the FPGA being enrolled. The result is customized configuration data 680, which includes both the challenge value 230 and the corresponding response 235. The patcher uses information from the original logic design 630 and/or an output of the compiler 635 to identify the portion of the configuration data that needed to be modified in order to embed the response value into the configuration data. Note that this results in different configuration data 680 being used for each FPGA 610 that is fielded, with the vast majority of the configuration data being common and only a small amount of the difference corresponding to the different response values. Optionally, the patcher 665 introduces other differences in each customized configuration data 680 in order to obfuscate the location of the response value 235, for example, should a party with access to a number of different instances of the customized configuration data compare the instances to identify which parts vary from device to device. Note that such comparison of instances does not yield the challenge value 230, which in this example is common to all the instances.

In field use, the customized configuration data 680 is used to configure the configurable logic 650 of the FPGA 610. The configurable logic implements desired functional logic 640 of the device, as well as a checker function 660. The checker function has embedded in it the challenge value 230, and can access the patched response value 235. The checker function 660 is configured to access the PUF circuit 225 in operation of the device, providing the challenge value and receiving the field-computed response value. The field computed response value is compared to the patched response value 235 by the checker function. In operation of the device, the checker function is invoked, for example, during an initialization phase or preferably, from time to time during operation of the device. If the checker function finds that the field-computed response does not match the enrollment response that is patched into the configuration data, the checker function causes the functional logic 640 of the design to be disabled. For example, required volatile memory in the device can be cleared or corrupted causing malfunction.

The checker function 660 is incorporated into the functional logic 640 in such a way that it forms an integrated portion of the logic. This makes it more difficult for a party to analyze the customized configuration data 680 and then modify the configuration data to disable the checker function. Furthermore, multiple instances of the checker function can be implemented in the design so that a party would have to identify all the instances and disable them all. As another alternative, multiple challenge-response pairs can be used, and each challenge used by a different checker function incorporated into the design.

In the example above, the generator module 670 is present in the customized configuration data 680 that is deployed in the field. As a further feature that can make compromising security more difficult, the generator module 670 is functionally disabled or entirely absent from the customized configuration data 680. In this way, should an adversary party discover the challenge value and identify the appropriate circuit locations that should hold the response values, that party would have to re-implement the generator function to obtain the response needed for a particular FPGA.

Figure 7A:
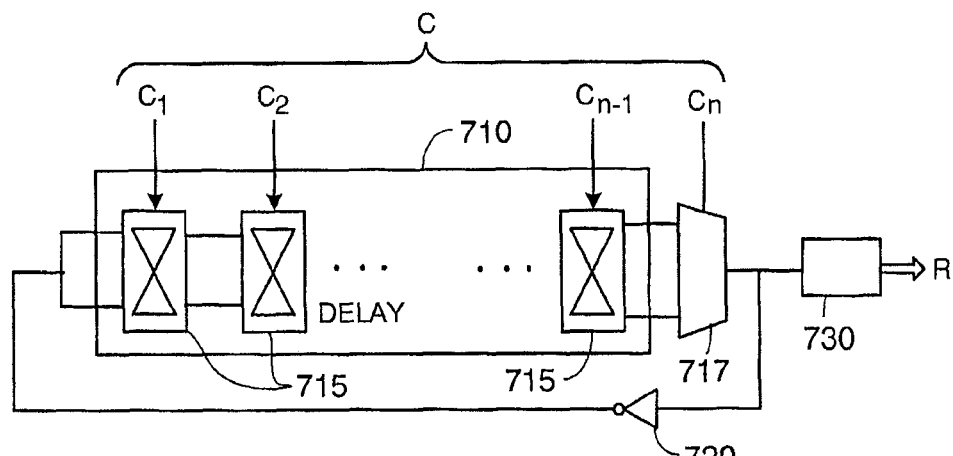
FIGS. 7A-B are diagrams of PUF circuits.
Figure 7B:
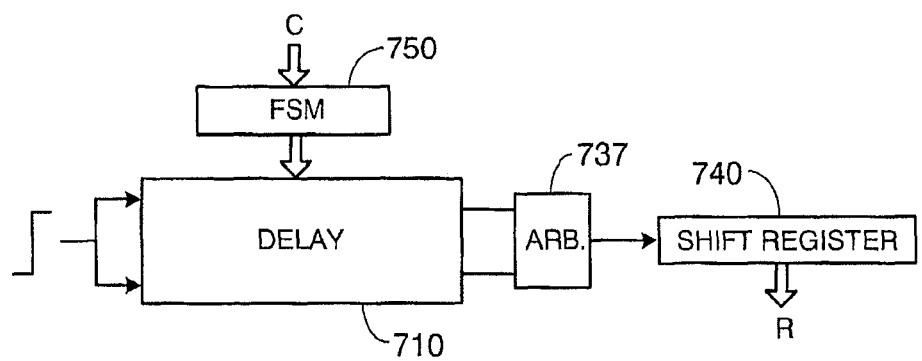

Referring to FIG. 7A, one approach to designing the PUF circuit for the approaches described above makes use of a delay module 710 whose delay depends on the binary values of the challenge at different bit positions. Each of the first n−1 bit positions of the challenge control whether a corresponding two input of a delay element 715 pass signals straight through or criss-cross to its two outputs. The final bit position of the challenge controls a selector that chooses either the top or the bottom output of the last delay element 715. With the same input passed to the two inputs of the first delay element 715, the delay from that input to the output of the selector 717 is dependent on the challenge input. The delay module 710 is put in a feedback path that causes oscillation at a period that depends on the delay through the delay module. A period measurement module 730 determines the response based on the period, for example, counting the duration of a set number of periods of oscillation. Referring to FIG. 7B, another approach makes use of the delay module 710 to generate two different delay paths from the input to the output. The two outputs are passed to an arbiter 737, which outputs 1 if the top signal rises first and 0 if the bottom signal rises first. Each output of the arbiter generates one bit of the response stored in a shift register. The challenge input C is used as a seed to a finite state sequence generator that outputs a series of derived challenges that are passed to the delay module to generate each bit of the response in turn.

Figure 8:
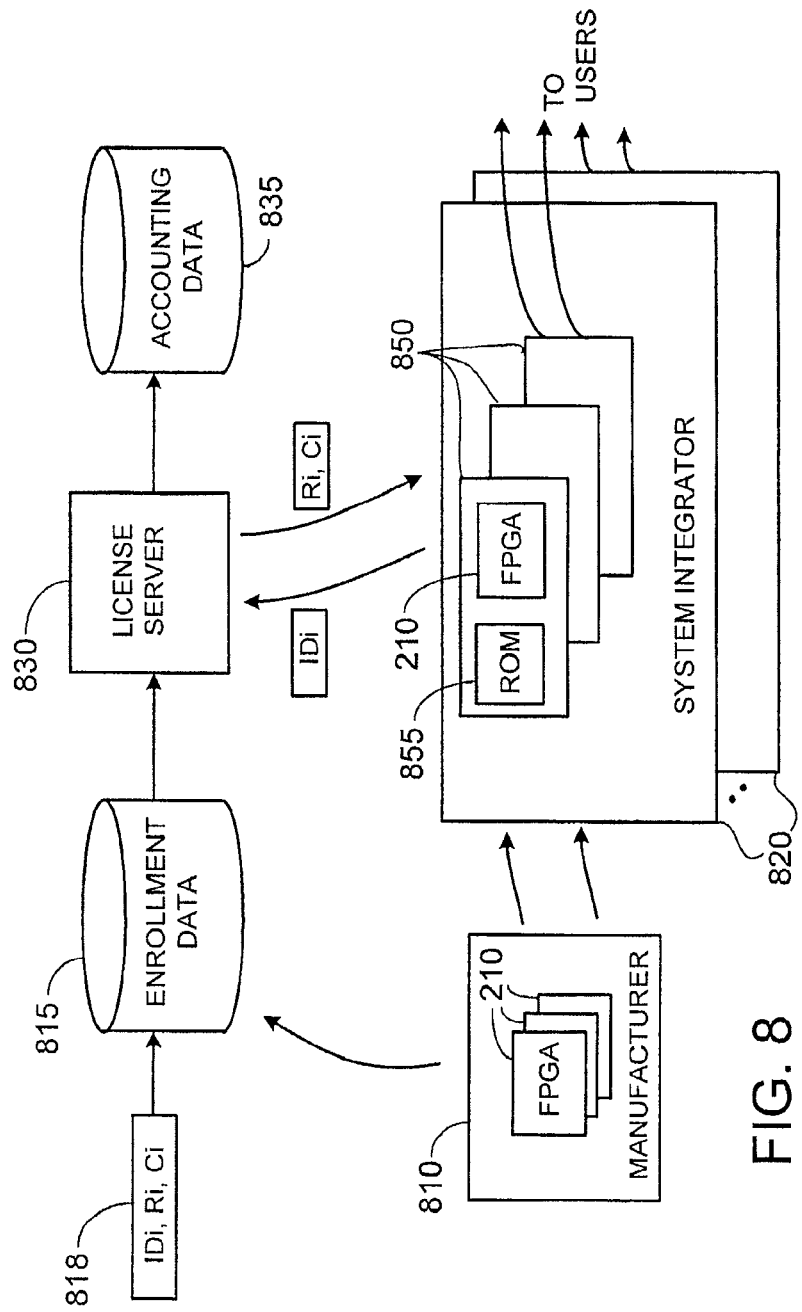
FIG. 8 is a block diagram of a system that includes a license server.

Referring to FIG. 8, one or more approaches of the types described above are used in an application which licenses or other accounted-for authorizations for use of logic designs are provided to one or more system integrators 820. For example, the system integrator may use an FPGA that is configured in a system 850 to use a logic design that is licensed from another party. The system integrator receives authorization to use that logic design on an FPGA-by-FPGA basis, thereby, for example, enabling payment of per-FPGA royalties to the party providing the logic design. The logic design is protected so that the system integrator cannot circumvent the licensing requirement and deploy more copies of the configured FPGA than authorized.

In the example shown in FIG. 8, in an enrollment phase, which is prior to distribution of the FPGAs to the system integrator, a party such as the manufacturer of the FPGA or an intermediate distributor enrolls each FPGA and stores a device identifications and one or more associated challenge-response pairs 818 for each FPGA. This enrollment data populates a database 815 that is used by a license server 830. The license server is accessed by the system integrator in order to obtain the data needed to enable each FPGA.

The enrolled FPGAs 210 are distributed to one or more system integrators. A system integrator receives encrypted configuration data for the FPGA, with the configuration data being decryptable using a key know to the license server. For each FPGA that the system integrator wants to have authorized to use the configuration data, the system integrator sends an identification of the FPGA to the license server, along with an identification of the configuration data. The license server uses the FPGA identification to find a challenge-response pair that is particular to that FPGA. It also uses the identification of the configuration data to find the key needed to decrypt the configuration data. The license server then combines the response and the key (for example, according to a bitwise exclusive or) to determine an access code that will be passed to the FPGA for use of the configuration data. The license server passes the challenge and the computed access code back to the system integrator, and the system integrator embeds the access code in the system that will be deployed, for example, in a non-volatile storage on the FPGA (e.g., fuses) or in an off-chip storage 855 (e.g., PROM). The license server keeps a record of the access codes it has provided to the system integrator and stores accounting data 855 which is later provided to the party providing configuration data.

In a related alternative approach, it is not necessary for the license server to have access to the key needed to decrypt configuration data. In this approach, the manufacturer knows the key and the enrollment data includes a challenge-access code pair. Furthermore, the manufacturer may generate multiple challenge-access code pairs for each FPGA, each for a different key. Each key can then be provided to a different configuration data provider by the manufacturer.

Figure 9:
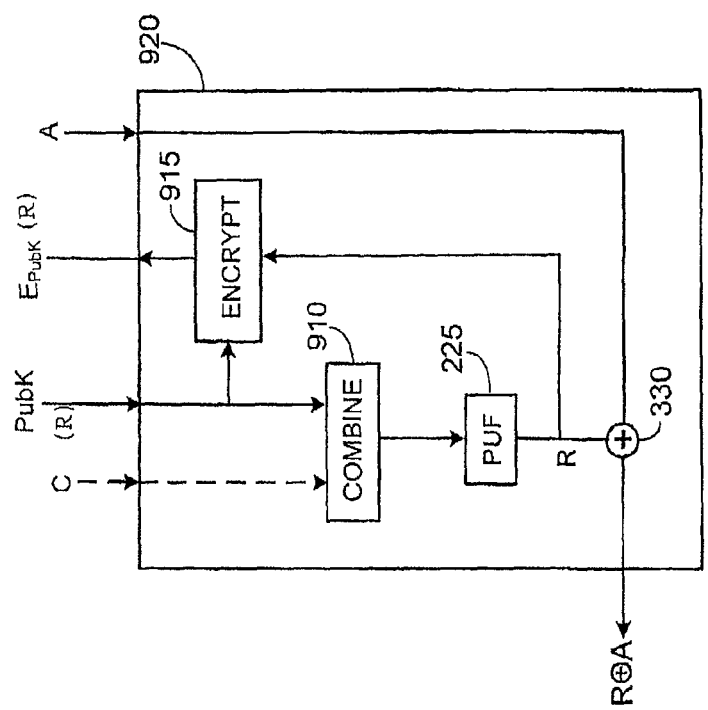
FIG. 9 is a diagram illustrating a PUF module that uses public key encryption.

Referring to FIG. 9 another approach to generating access codes involves public key encryption. In this approach, a trusted party, such as a license server, generates a private-public key pair (PrivK-PubK). An FPGA 1010 (not shown in FIG. 9) includes an alternative PUF module 920 that receives the public key (PubK) and optionally an additional challenge (C). The input to the PUF circuit 225 is the public key, or alternatively a non-invertible function of the additional challenge and the public key. (Even without an optional challenge, the public key may be modified by a non-invertible function, for example, to reduce the number of bits for the PUF circuit input). The output of the PUF circuit (R) is encrypted in a public key encryption module 915 before it is provided outside the FPGA. Therefore, only a party that has access to the private key corresponding to the public key used can decrypt the FPGA output to determine the PUF response.

Figure 10:
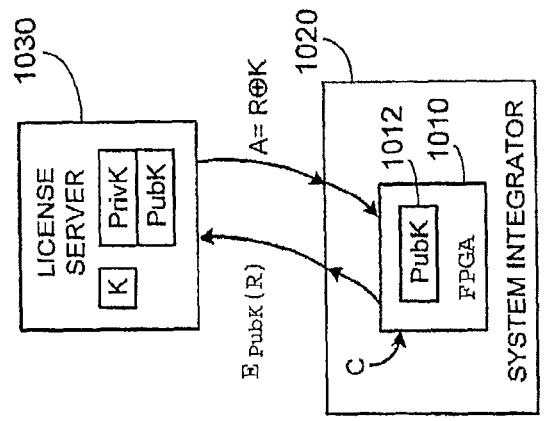
FIG. 10 is a block diagram using a license server in conjunction with a PUF module shown in FIG. 9.

Referring to FIG. 10, a system integrator 1020 configuring a system that incorporates an FPGA 1010 that uses the PUF module 920 receives the public key (PubK) from a license server 1030. The system integrator optionally adds its own challenge (C) and obtains the encrypted response from the FPGA. The encrypted response is passed back to the license server, where it is decrypted using the private key known to the license server. Having determined the response, and knowing the key (K) needed to decrypt the configuration data for the FPGA, the license server computes the needed access code (A) and passes the access code back to the system integrator. The system integrator then integrates the access code, and if needed its own challenge, into the system being configured. The license server keeps track of the number of access codes that were computed and stores accounting data as described above.

Other approaches that generate challenge response pairs, for example, based on delay characteristics or other circuit characteristics can also be used. Techniques that can be used in or combined with the approaches described above can be found in US Application Publication US2003/0204743A1, which is incorporated herein by reference.

Approaches described above are applicable to various types of configurable devices. For example, the configuration data can include one or more of logic configuration data and instructions used in operating the device. The instructions can include controller instructions, micro-code, machine instructions for a programmable processor (e.g., for an x86 instruction set architecture), instructions for a virtual machine or processor (e.g., Java instructions), or instructions for a software interpreter. Furthermore, the encrypted information can include content that is to be presented to a user rather than or in addition to logic configuration data or instructions. One example is encryption of audio or video content data for presentation on or using a device, but that cannot be presented on or using another similar device that does not have the same PUF response and volatile key internally.

It is to be understood that the foregoing description is intended to illustrate and not to limit the scope of the invention, which is defined by the scope of the appended claims. Other embodiments are within the scope of the following claims.

What is claimed is:

1. A method for configuring an electronic device having configurable logic comprising:
   providing configuration data to the device, the configuration data including first configuration data and encrypted configuration data;
   configuring at least part of the configurable logic according to the first configuration data, including forming a key generator in the configurable logic;
   generating a volatile key using the key generator configured in configurable logic circuitry in the device, the volatile key dependent on a fabrication variation among devices fabricated according to a same design as the device;
   decrypting the encrypted configuration data within the device using the generated volatile key; and
   configuring at least another part of the configurable logic on the device using the decrypted configuration data.

2. The method of claim 1 wherein configuring the configurable logic on the device includes configuring a programmable gate array according to the decrypted configuration data.

3. The method of claim 1 further comprising:
   clearing all information stored on the device from which the volatile key can be determined; and
   wherein generating the volatile key is performed without the device receiving information from which the volatile key can be determined subsequent to the clearing of the information.

4. The method of claim 1 wherein configuring at least part of the configurable logic according to the first configuration data includes forming at least part of logic for the decryption of the encrypted configuration data.

5. The method of claim 1 wherein generating the volatile key includes generating a volatile response, and the method further comprises performing at least one of (a) providing a first input value to the device that is used to generate the volatile response based, and (b) providing a second input value to the device and combining the volatile response and the second input value to determine the volatile key.

6. The method of claim 5 further comprising storing at least one of the first value and the second value in a non-volatile storage on the device.

7. The method of claim 5 further comprising determining at least one of the first value and the second value such that a desired volatile key is generated.

8. A method of operating a configurable logic device comprising:
   loading a configurable logic device with a first module for generating a volatile response that varies among configurable logic devices fabricated according to the same design;
   using the first module to generate a first volatile response for the device;
   forming configuration data according to the first volatile response;
   loading the configuration data into the configurable logic device, including implementing the first module in the configurable logic device;
   operating the device according to the configuration data including
      using the first module to generate a second volatile response for the device;
      determining whether the second volatile response matches the first volatile response;
      disabling functionality specified by the configuration data if the second volatile response does not match the first volatile response.

9. The method of claim 8, wherein disabling functionality includes inhibiting configuration of the configurable logic.

10. The method of claim 8, wherein disabling functionality includes at least one of disabling functionality implemented in the configurable logic prior to an initial use of the functionality after configuration of the logic, and disabling functionality during use of the functionality.

* * * * *